(12) United States Patent
Zhou et al.

(10) Patent No.: US 9,559,949 B1
(45) Date of Patent: *Jan. 31, 2017

(54) SYSTEM AND METHOD FOR IMPROVING ROUTING LABELING

(71) Applicant: Google Inc., Mountain View, CA (US)

(72) Inventors: Junlan Zhou, Sunnyvale, CA (US); Zhengrong Ji, Sunnyvale, CA (US); Yuguang Wu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,214

(22) Filed: Jun. 5, 2015

Related U.S. Application Data (60) Continuation of application No. 14/148,027, filed on Jan. 6, 2014, now Pat. No. 9,077,660, which is a division of application No. 12/847,242, filed on Jul. 30, 2010, now Pat. No. 8,649,384.

(51) Int. Cl.
*H04L 12/723* (2013.01)
*H04L 12/701* (2013.01)
*H04L 12/801* (2013.01)

(52) U.S. Cl.
CPC ............ *H04L 45/50* (2013.01); *H04L 45/00* (2013.01); *H04L 47/10* (2013.01)

(58) Field of Classification Search
CPC ................ G06F 15/17381; G06F 15/17368; H04L 29/06; H04L 29/08072; H04L 45/00; H04L 45/02; H04L 45/04; H04L 45/50; H04L 47/10
See application file for complete search history.

(56) References Cited

U.S. PATENT DOCUMENTS

| | | |
|---|---|---|
| 7,486,659 B1 | 2/2009 | Unbehagen et al. |
| 7,602,702 B1 | 10/2009 | Aggarwal |
| 2002/0101868 A1 | 8/2002 | Clear et al. |
| 2003/0012189 A1* | 1/2003 | Nomura ............... H04L 45/02 370/389 |
| 2003/0126289 A1 | 7/2003 | Aggarwal et al. |
| 2007/0258361 A1* | 11/2007 | McEwen ............ H04L 12/5695 370/229 |
| 2010/0329265 A1 | 12/2010 | Lapuh et al. |

* cited by examiner

*Primary Examiner* — Khoa Huynh
(74) *Attorney, Agent, or Firm* — McDermott Will & Emery LLP (57) ABSTRACT

A router residing in a network comprises at least one ingress port, at least one egress port, and a processor programmed to compare at least two label switch paths, determine potential conflicts between the at least two label switch paths based on the ingress ports and egress ports utilized by the label switch paths, and determine a selected identifier to be assigned relative to each label switch path. The processor is configured to assign a common identifier if no conflict exists. A storage medium is operatively coupled to the processor for storing the selected identifiers related to the label switch paths. The processor may be configured to determine that a conflict exists between two label switch paths if they utilize the same ingress port on the router and different egress ports on the router.

20 Claims, 10 Drawing Sheets

SYSTEM AND METHOD FOR IMPROVING ROUTING LABELING

CROSS REFERENCE TO RELATED APPLICATIONS

This application is a continuation of U.S. application Ser. No. 14/148,027, filed on Jan. 6, 2014, which is a divisional of U.S. application Ser. No. 12/847,242, filed on Jul. 30, 2010, the disclosure of which is incorporated herein by reference.

BACKGROUND OF THE INVENTION

Multiple Protocol Label Switching (MPLS) has been widely deployed in service provider networks to address a multitude of problems in such networks, including speed, scalability, quality of service, and traffic engineering (TE). An MPLS network comprises a set of Label Edge Routers (LERs) and Label Switch Routers (LSRs).

An LER is located on the edge of an MPLS network. It encapsulates packets entering the MPLS network with labels, and strips labels from packets exiting the MPLS network. Its forwarding plane thus has two tables, an Encapsulation Label Table (ELT) storing labels to be pushed into packets, and a Terminating Label Table (TLT) storing labels to be popped from the packets.

The core of an MPLS network typically consists of LSRs, which forward packets based on labels in their headers and ingress ports. Such forwarding decisions are stored in Label Forwarding Information Base (LFIB), which has a lookup key of (ingress_port, label). Label switch paths (LSPs) are paths between an ingress LER and an egress LER of an MPLS network. Therefore, the LSP typically traverses two LERs and one or more LSRs.

The number of possible LSPs between ingress and egress LERs can be very high, i.e., two to the power of the number of LSRs. Because in a conventional MPLS network one label is assigned to each LSP, the number of labels can also be extremely large. However, resources (e.g., LFIB, ELT, and TLT) on the routers are limited, and thus the large number of labels may impede operation of the routers and/or increase the cost of operating and maintaining the network.

SUMMARY OF THE INVENTION

One aspect of the present invention provides a method for reducing resources consumed in a network. This method comprises assigning one label to two or more label switch paths if at least one of the following conditions is satisfied: (a) the two or more label switch paths do not traverse a common router; (b) the two or more label switch paths traverse a common router through different ingress ports; and (c) the two or more label switch paths traverse a common router and are forwarded to the same next hop. The method may further comprise storing the assigned label in an encapsulation label table on a label edge router. Such method may be performed in a multiple protocol label switching network.

In some instances, the above described method may further comprise comparing a plurality of the label switch paths on the network, and determining which ones of the plurality of label switch paths may be assigned the same label so that a minimum number of labels are assigned. This determining may include constructing a conflict graph illustrating a relationship between selected label switch paths in the plurality of label switch paths.

Another aspect of the invention provides a method for reducing consumption of resources on a network, comprising assigning a common identifier to two or more ingress ports on a router, unless a predetermined condition is met, and storing the common identifier on the router. The predetermined condition may be that the two or more ingress ports receive packets from two or more label switch paths assigned with the same label, and at least one of the label switch paths includes a different next hop than at least another one of the label switch paths. The identifier may be a virtual routing and forwarding identifier which is stored in a label forwarding information base of the router. A conflict graph may be constructed to illustrating a relationship between each ingress port of the router, and thereby facilitate assignment of the identifiers.

Yet another aspect of the invention provides a router residing in a network, the router comprising at least one ingress port, at least one egress port, a processor programmed to compare at least two label switch paths, determine potential conflicts between the at least two label switch paths based on the ingress ports and egress ports utilized by the label switch paths, and determine a selected identifier to be assigned relative to each label switch path, the processor being configured to assign a common identifier if no conflict exists, and a storage medium operatively coupled to the processor for storing the selected identifiers related to the label switch paths. The processor may be configured to determine that a conflict exists between two label switch paths if they utilize the same ingress port on the router and different egress ports on the router. According to this aspect, the router may be a label edge router in a multiple protocol label switching network, wherein the selected identifier assigned by the processor is a label, and the storage medium includes an encapsulation label table. Alternatively, the router may be a label switch router in a multiple protocol label switching network, wherein the selected identifier assigned by the processor is a virtual routing and forwarding identifier, and the storage medium includes a label forwarding information base.

An even further aspect of the invention provides a computer-readable medium storing a computer-readable program for implementing a method of reducing consumption of resources in a network on an information processing apparatus. According to this method, two or more label switch paths on the network are compared, and it is determined whether any of the following conditions are met: (a) the two or more label switch paths do not traverse a common router; (b) the two or more label switch paths traverse a common router through different ingress ports; and (c) the two or more label switch paths include the same next hop from a commonly traversed router. Labels are assigned to the two or more label switch paths, wherein a common label may be assigned to the two or more label switch paths if any of the conditions are satisfied. According to one aspect, the method may also compare any label switch paths assigned with a common label, identify the ingress ports and egress ports on a router utilized by the commonly labeled paths, and assign a common virtual routing and forwarding identifier to the ingress ports utilized by the label switch paths, unless a predetermined condition is satisfied. The predetermined condition may be satisfied if two or more commonly labeled paths utilize a common ingress port on the router, and different egress ports on the router.

DETAILED DESCRIPTION

Figure 1:
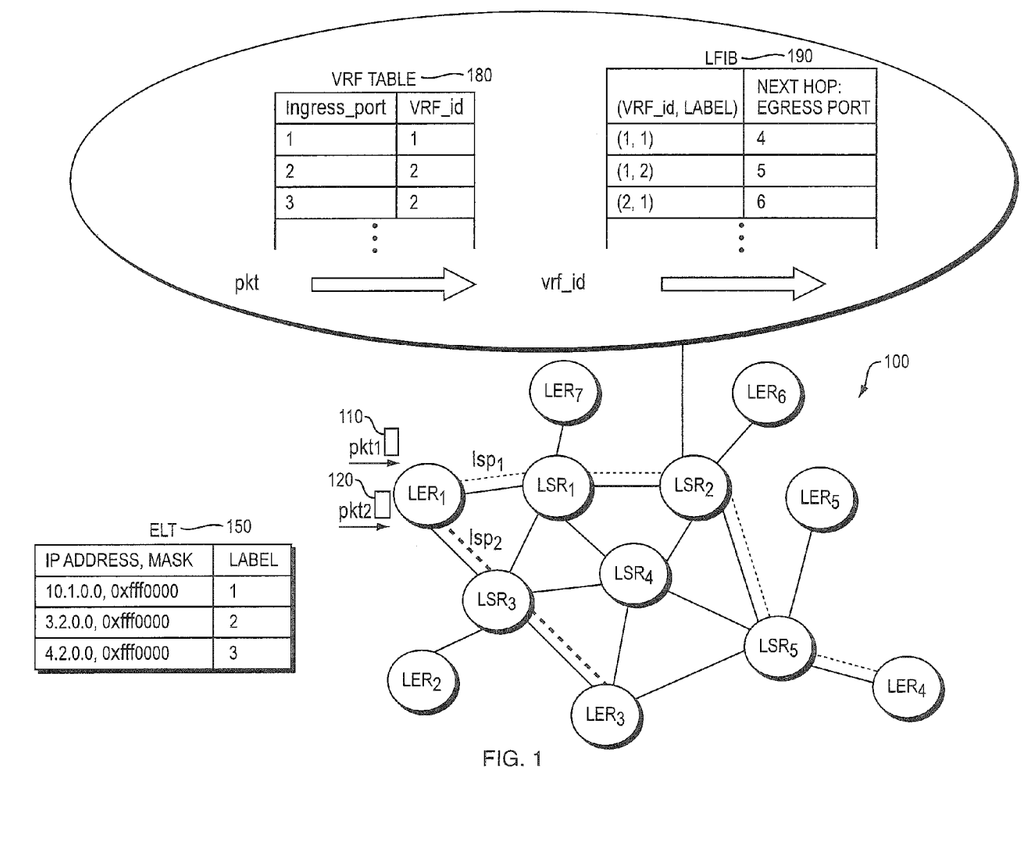
FIG. 1 is a system diagram according to an aspect of the invention.

According to an aspect of the invention, labels in MPLS networks are assigned to multiple LSPs. FIG. 1 illustrates an example of two packets 110, 120 entering a MPLS network 100. The packets 110, 120 enter through edge router $LER_1$, which encapsulates the packets with labels. For example, a forwarding plane of $LER_1$ has an Encapsulation Label Table (ELT) 150, storing labels to be pushed into the packets 110, 120. The ELT 150 may determine the destination address of the packets 110, 120, and assign a label for the path between the $LER_1$ and the destination address. However, in contrast to conventional MPLS networks, the same label may be assigned to more than one path, as will be explained in further detail below.

Once the packets 110, 120 are assigned labels, such information may be stored in a packet header. As the packets 110, 120 proceed through the MPLS network, label switch routers $LSR_1$, $LSR_2$, and $LSR_5$ will forward the packet 110 based on the label designated for label switch path $LSP_1$. Similarly, $LSR_3$ forwards the packet 120 based on the label assigned for $LSP_2$. As an example of how the packets are forwarded, $LSR_2$ includes a virtual routing and forwarding (VRF) table 180 and a label forwarding information base (LFIB) 190. As the packet 110 enters an ingress port of the $LSR_2$, the $LSR_2$ looks up a virtual routing and forwarding identifier (VRF_id) based on the ingress port through which the packet 110 came. The number of VRF_ids assigned to packets may also be reduced in comparison to conventional MPLS networks, by assigning the same VRF_id to packets entering through various ingress ports. This will also be discussed in further detail below. Once the VRF_id is assigned, the LFIB 190 uses this information, along with the label assigned by the $LER_1$, to determine a next hop in the network (and a corresponding egress port on the $LSR_2$) for the packet 110. Thus, the repetition of VRF_ids for multiple ingress ports reduces space on the LFIB 190, because it significantly reduces the required number of (VRF_id, label) entries, i.e., the number of VRF_ids times the number of labels.

The assignment of overlapping labels may be based on a set of predefined rules to ensure that no conflicts are created by the assignment of one label to more than one LSP. Thus, a router may be programmed to analyze the various LSPs, determine which LSPs can or cannot be assigned the same label as other LSPs, and assign labels accordingly. In this regard, fewer labels may be assigned than in a conventional MPLS network, and therefore an amount of label space consumed is significantly reduced.

Figure 2:
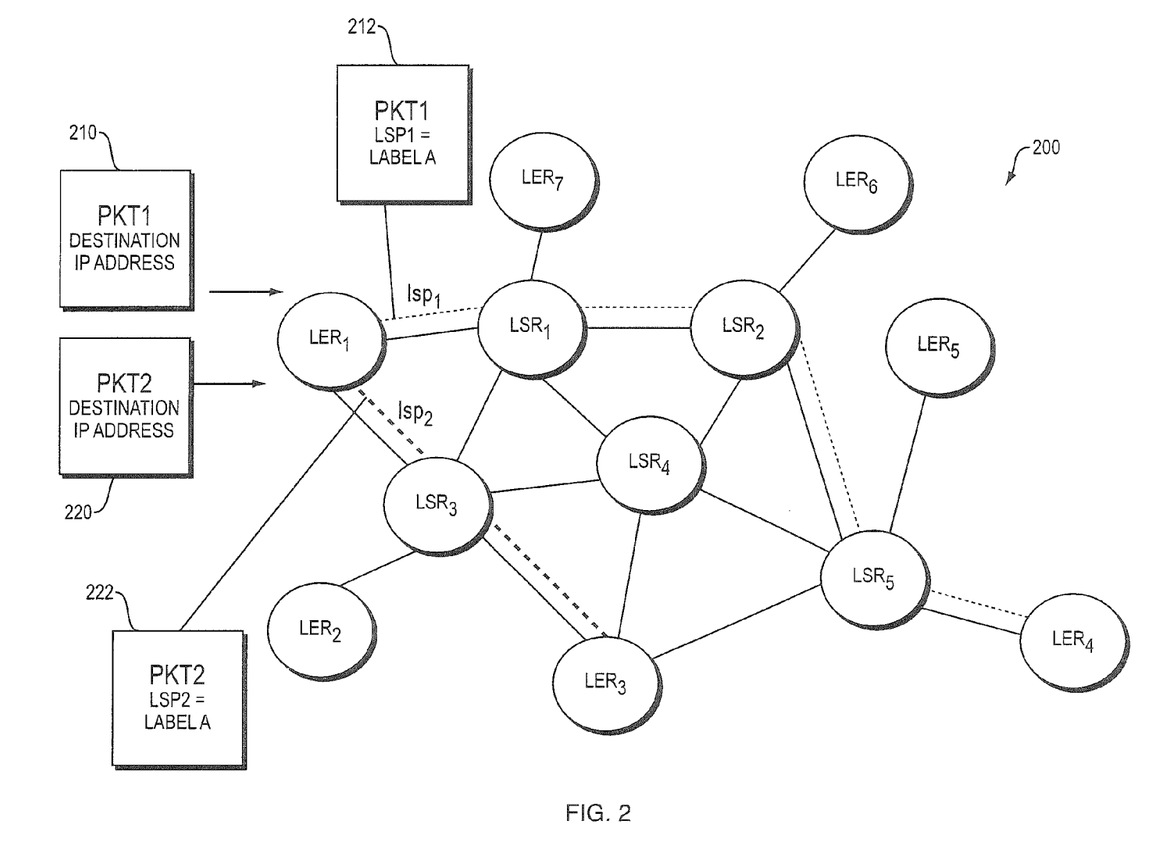
FIG. 2 is a system diagram according to another aspect of the invention.

A first one of the predefined rules is illustrated in FIG. 2. As shown, a first packet 210 enters the network 200 through $LER_1$. The packet 210 identifies its intended destination IP address, and the $LER_1$ determines a label switch path $LSP_1$ for the packet 210 to reach its destination. The $LSP_1$ includes label switch routers $LSR_1$, $LSR_2$, and $LSR_5$. Similarly, a second packet 210 enters the network 200 identifying a different intended IP address. Thus, the $LER_1$ determines a different $LSP_2$ for the packet 220 to reach its destination. The $LSP_2$ traverses $LSR_3$. Thus, $LSP_1$ and $LSP_2$ do not cross at all. Because $LSP_1$ and $LSP_2$ do not traverse a common LSR, they may be assigned the same label. An LSR uses the label to determine a next hop of the packets 210, 220. Because the same LSR will never receive a packet along $LSP_1$ and $LSP_2$, the next hop will always be the same for each label. Thus, the forwarding decision by an LSR along $LSP_1$ is unaffected by labeling $LSP_2$ the same as $LSP_1$, because the LSR will never receive a packet along $LSP_2$. Accordingly, as shown in FIG. 2, $LSP_1$ is assigned label A. Packet 212, which is the packet 210 after it has been encapsulated with a label by $LER_1$, now includes label A information in its header. Packet 222, which is packet 220 after it has been encapsulated with a label by $LER_1$, also includes label A information in its header. Nevertheless, these packets 212 and 222 will traverse their respective paths, $LSP_1$ and $LSP_2$.

Figure 3:
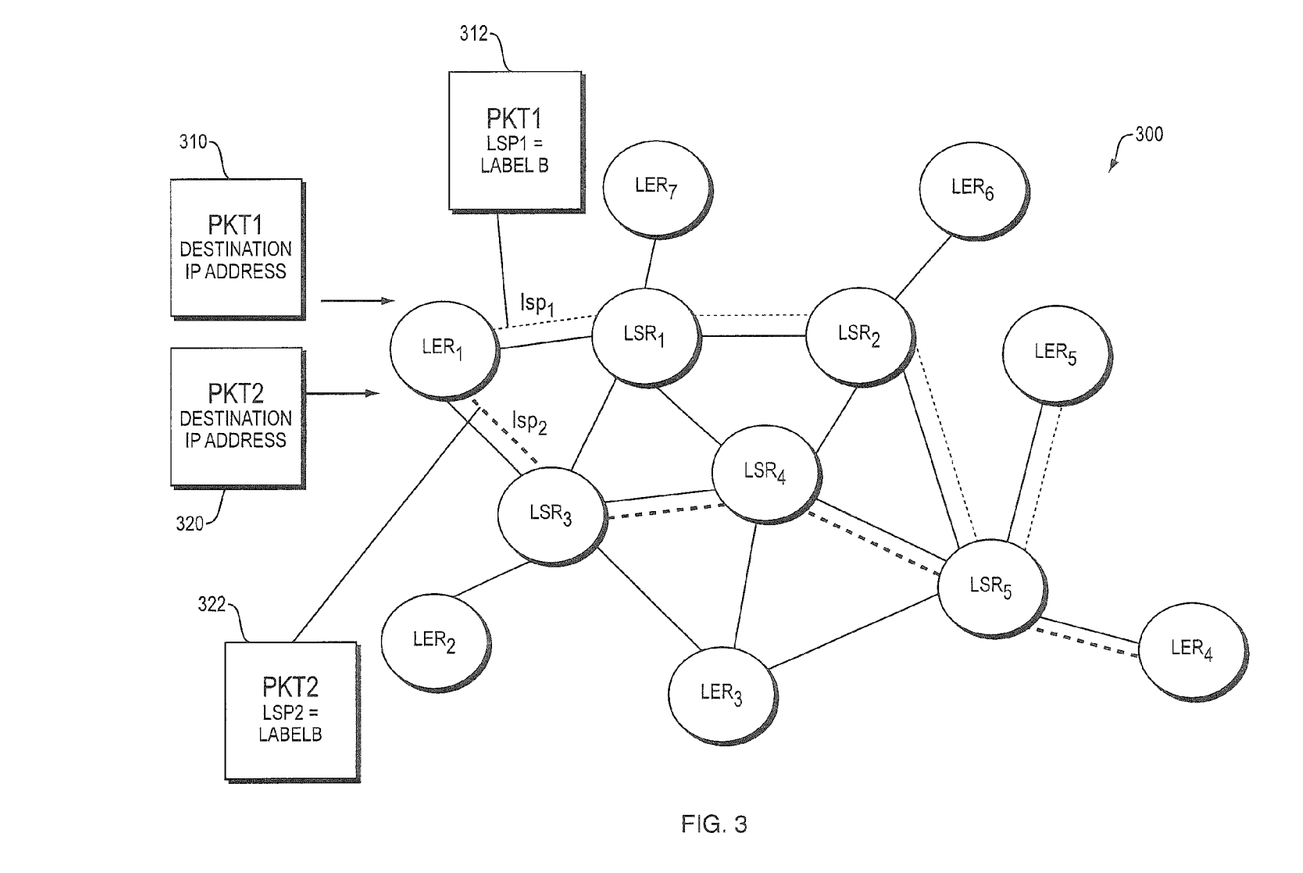
FIG. 3 is a system diagram according to another aspect of the invention.

A second one of the predefined rules is illustrated in FIG. 3. According to this rule, two LSPs may be assigned the same label if on any LSR traversed by both LSPs, the ingress ports are different. For example, a first packet 310 indicates a destination IP address, and its $LSP_1$ to reach that destination address from $LER_1$ includes $LSR_1$, $LSR_2$, and $LSR_5$. A second packet 320 indicates another destination IP address, and its $LSP_2$ to reach that address from $LER_1$ includes $LSR_3$, $LSR_4$, and $LSR_5$. Thus, $LSP_1$ and $LSP_2$ cross at $LSR_5$. However, $LSP_1$ and $LSP_2$ may nevertheless be assigned the same label, because they utilize different ingress ports of $LSR_5$. As mentioned in connection with FIG. 1, a packet is assigned a VRF_id at an LSR based on its ingress port. Its (VRF_id, label) is matched at the LFIB to determine its next hop router on the network. Accordingly, each port may be assigned a unique VRF_id to avoid conflict. If each port is assigned a unique VRF_id, two LSPs arriving at an LSR from different ingress ports will match different LFIB entries, regardless of their labels. Hence, assigning identical labels to these LSPs would not change the forwarding behaviors of their packets at the $LSR_5$, where they cross. Thus, packets 312 and 322 may store header information identifying the same label assigned by the $LER_1$, and still reach their respective destination addresses, despite that their respective paths $LSP_1$ and $LSP_2$ will cross.

Figure 4:
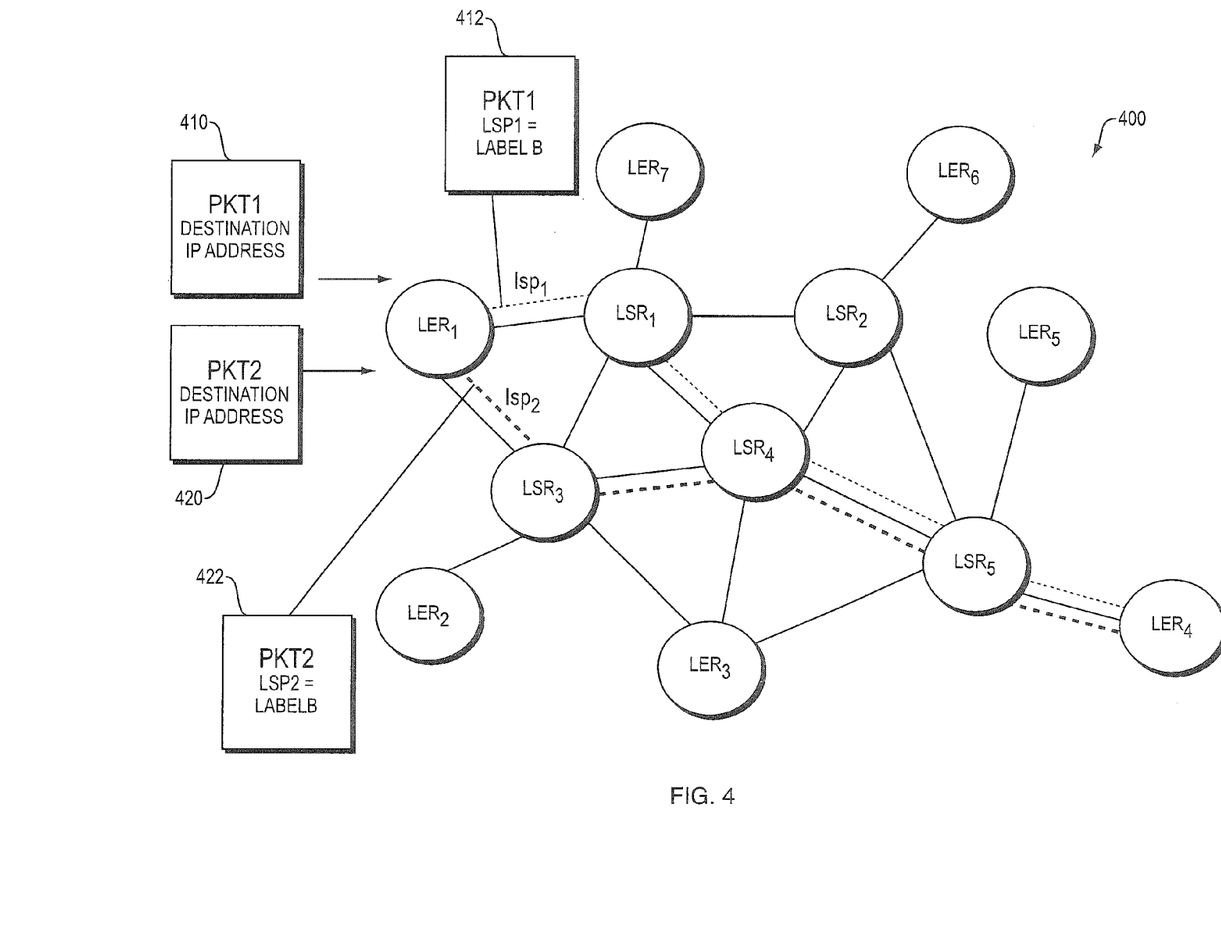
FIG. 4 is a system diagram according to another aspect of the invention.

FIG. 4 illustrates a third predefined rule, where two LSPs may be assigned the same label if on any LSR traversed by both LSPs, the next hop is identical. For example, $LSP_1$ and $LSP_2$ both traverse $LSR_4$ in FIG. 4. As explained above, this crossing at $LSR_4$ will not cause a conflict if $LSP_1$ and $LSP_2$ are assigned the same label, because they have different ingress ports. However, in FIG. 4 the $LSP_1$ and $LSP_2$ also each traverse $LSR_5$ from the same ingress port. Nevertheless, $LSP_1$ and $LSP_2$ may still be assigned the same label, because the next hop after $LSR_5$ is the same for both $LSP_1$ and $LSP_2$. Accordingly, $LSP_1$ and $LSP_2$ may share an LFIB entry (VRF_id, label) in $LSR_5$.

Conversely to the third predefined rule explained above, two LSPs cannot be assigned the same label if an ingress port on an LSR could receive packets from both LSPs, and these packets are to be forwarded to different next hops. Using the example of FIG. 4, if $LSP_1$ and $LSP_2$ terminated at different LERs (e.g., if $LSP_1$ terminated at $LER_5$ and $LSP_2$ terminated at $LER_4$), $LSP_1$ and $LSP_2$ could not be assigned the same label. If they were assigned the same label, they would be assigned the same VRF_id and be assigned to the same LFIB entry at the $LSR_5$. The result would be that at least one of the packets 412, 422 would be incorrectly forwarded to the wrong next hop, because both packets 412, 422 would be forwarded to the same next hop.

Using the predefined rules described above, an LER may determine how to label LSPs using a minimum number of labels. For example, the LER may run a software program, executing a series of steps to determine which LSPs may share labels. The software may be run during initialization of the network, periodically for updating the network, and/or any time a new LSP or network router is added. A method of determining which LSPs may share labels, and thus minimizing ELT/TLT space requirements on an MPLS network, is described in connection with FIGS. 5-7.

Figure 5:
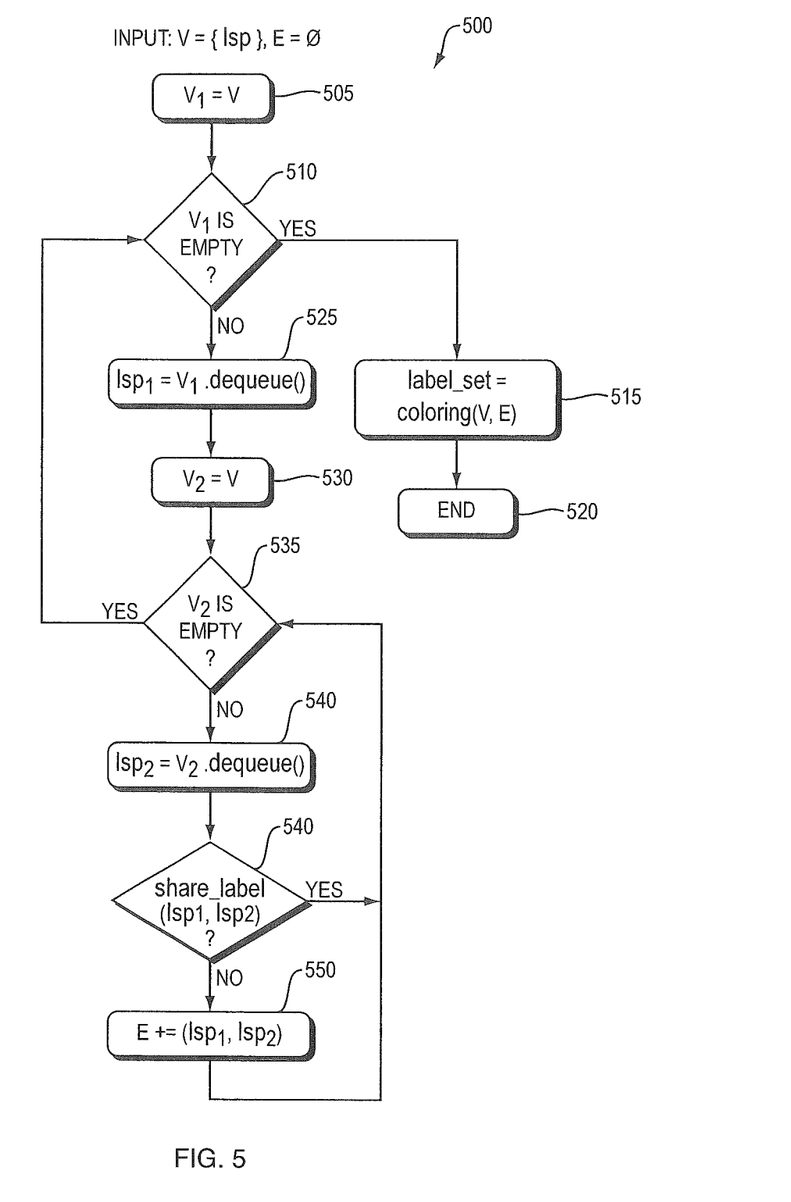
FIG. 5 is a flow diagram of a method for constructing a conflict graph according to an aspect of the invention.
Figure 6:
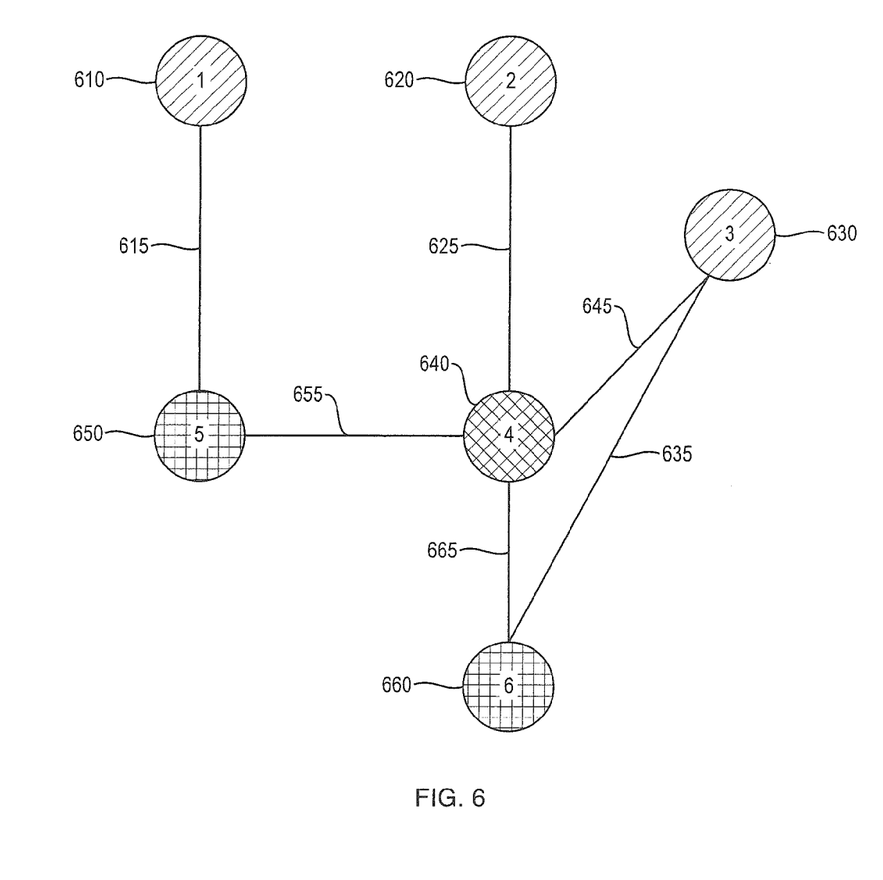
FIG. 6 is a conflict graph according to an aspect of the invention.

FIG. 5 illustrates a method 500 for optimizing space on the ELT and TLT in an MPLS network by constructing a conflict graph to determine which LSPs may be assigned the same label. The graph, an example of which is shown in FIG. 6, comprises one or more vertexes (e.g., vertexes 610, 620, 630, 640, 650, 660), with each vertex corresponding to an LSP. There may be an edge (e.g., edges 615, 625, 635, 645, 655, 665) drawn between vertexes in some instances. This edge indicates that the two vertexes which it connects cannot be assigned the same label.

In step 505, a set of all possible LSPs is defined. In step 510, it is determined whether this set is empty, in which case analysis of the LSPs is complete. However, if the set is not empty, a first LSP is selected from the set in step 525, and a vertex is created for the first selected LSP. For example, looking to graph 600 of FIG. 6, the vertex created for the first selected LSP may be vertex1 610. The first selected LSP may then be removed from the set.

In step 530, a set of LSPs to be compared with the first selected LSP is defined. It is determined at step 535 whether the set of LSPs to be compared with the first selected LSP is empty, and if so the process returns to step 510. However, if the set is not empty, a second LSP is selected and a vertex is created for the second LSP in step 540, and the second LSP is removed from the predefined set. Keeping with the example shown in FIG. 6, the second selected LSP may be represented by vertex2 620.

It is then determined at step 545 whether the first selected LSP and the second selected LSP can share a label. For example, the first and second selected LSPs may be analyzed in view of one or more of the predefined rules discussed above in connection with FIGS. 2-4. The analysis or determination may be performed according to the method described below in connection with FIG. 7. If it is determined that the first and second LSPs may share a label, e.g., that sharing a label would not violate the predefined rules, nothing further is created on the graph 600 at this point with respect to vertex1 610 and vertex1 620. Rather, the process returns to step 535 to determine if there are any other vertexes to be created. However, if it is determined that the first and second selected LSPs cannot share a label because of one or more conflicts, an edge is created between the vertexes set for the two LSPs. For example, in the graph 600, the conflict between vertex1 610 representing a first LSP, and vertex5 650 representing another LSP, is represented by edge 615.

If it is determined at step 535 that the set of LSPs to be compared to the first selected LSP is empty, the process returns to step 510 to determine if there are any further LSPs to be analyzed. If there are not, the process then proceeds to step 515, where each vertex is colored or shaded to indicate its number of conflicts. However, if it is determined at step 535 that there are additional LSPs to be compared, the process continues to select another LSP (e.g., the LSP represented by vertex5 650), to determine if there are any conflicts with the first selected LSP (represented by vertex1 610), and continues to construct the graph 600 accordingly.

As mentioned above, once steps 505-510 and 525-550 of the process 500 are complete, and the vertexes and edges of the graph 600 are created, the vertexes may be colored in step 515 to more clearly indicate which LSPs may share a label to conserve the most space in the ELT/TLT. For example, in the graph 600, $LSP_1$ (vertex 610) conflicts with $LSP_5$ (vertex 650), the conflict represented by edge 615. $LSP_2$ (vertex 620) conflicts with $LSP_4$ (vertex 740), the conflict represented by edge 625. $LSP_3$ (vertex 630) conflicts with $LSP_4$ (vertex 640) and $LSP_6$ vertex 660), as represented by edges 645 and 635, respectively. $LSP_4$ (vertex 740) conflicts with $LSP_5$ (vertex 650), $LSP_2$ (vertex 620), $LSP_3$ (vertex 630), and $LSP_6$ (vertex 660), as represented by respective edges 655, 625, 645, 665.

Accordingly, it can be seen that $LSP_1$ (vertex 610), $LSP_2$ (vertex 620), and $LSP_3$ (vertex 630) do not conflict with one another. Thus, in step 515 each of vertex 610, 620, and 630 may be shaded or colored the same. It may further be seen that $LSP_5$ (vertex 650) and $LSP_6$ (vertex 660) do not conflict with each other, and may therefore take the same color as each other, but a different color than vertexes 610-630. Lastly, because $LSP_4$ (vertex 640) conflicts with many other LSPs, it must be assigned a different color than each of vertexes 650, 620, 630, and 660.

It should be understood that in addition or alternative to coloring or shading, any convention for visually indicating similarities or differences (e.g., different shapes, sizes, hatching, etc.) may be used. In addition, any of a variety of non-visual cues may be used to indicate which LSPs may be assigned the same label. For example, a data processor may automatically assign a label or other identifier (e.g., an alphanumeric identifier) to the LSPs.

Figure 7:
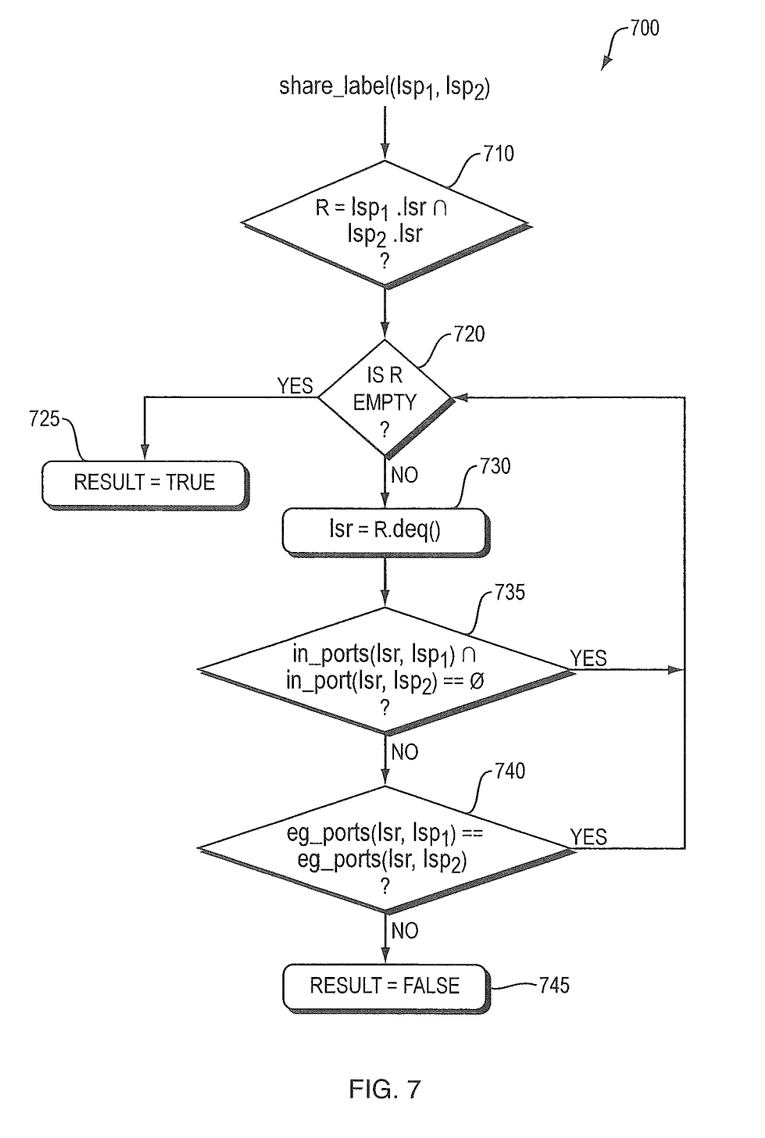
FIG. 7 is a flow diagram of a method for determining whether label switch paths may share a label according to an aspect of the invention.

FIG. 7 illustrates a method 700 for determining the minimum number of labels that may be assigned to LSPs in an MPLS network. The method 700 may be performed in conjunction with the method 500 of constructing the conflict graph, to determine how to best (e.g., minimally) apportion labels. For example, the method 700 may set forth in further detail the steps to be performed in connection with step 545 of FIG. 5.

In step 710, a set of LSRs which are traversed by each of a first LSP ($LSP_1$) and a second LSP ($LSP_2$) is defined. In step 720, it is determined whether this set of LSRs is empty. For example, it may be determined that no LSR is traversed by both $LSP_1$ and $LSP_2$, in which case the set would be empty and no conflicts exist. In this case, the method 700 would process to step 725, where it is confirmed that $LSP_1$ and $LSP_2$ may share a label. However, it may be determined at step 720 that there is at least one LSR traversed by both $LSP_1$ and $LSP_2$, in which case the method 700 proceeds to step 730.

In step 730, a first LSR of the set is selected. Step 735 utilizes the function in_ports(lsr,lsp), which returns a list of ingress ports on the selected LSR for a given LSP. Thus, in step 735, it is determined whether any of the ingress ports on the selected LSR for $LSP_1$ overlap with any of the ingress ports on the selected LSR for $LSP_2$. If there is no such overlap, no conflict exists between the $LSP_1$ and the $LSP_2$, and the process returns to step 720 to determine if there are any further LSRs traversed by both $LSP_1$ and $LSP_2$. However, if step 735 returns at least one ingress port on the selected LSR that is used by both $LSP_1$ and $LSP_2$, the process continues to step 740.

Step 740 utilizes the function eg_ports(lsr,lsp), which returns a list of egress ports on a selected LSR for a given LSP. Accordingly, in step 740 it is determined whether any of the egress ports on the selected LSR for $LSP_1$ overlap with any of the egress ports on the selected LSR for $LSP_2$. If at least one egress port is returned, thereby indicating that $LSP_1$ and $LSP_2$ both utilize the same egress port on the selected LSR, no conflict exists, because the forwarding behavior of the selected LSR is not changed, despite that $LSP_1$ and $LSP_2$ also utilize the same ingress port. In this case, the process returns to step 720. However, if it is determined that there is no overlap in egress ports for the selected LSR utilized by both $LSP_1$ and $LSP_2$, a conflict is created by the overlapping use of an ingress port determined in step 735. Therefore, step 745 returns a result of "false," indicating that $LSP_1$ and $LSP_2$ may not share a label.

In addition to saving resources on the ELT/TLT in an MPLS network, resources may also be conserved in the LFIB. For example, another predefined rule may be implemented to determine whether a VRF_id may be assigned to more than one ingress port on a particular LSR. That is, two ingress ports may be assigned the same VRF_id unless they may receive packets from two different LSPs having the same label and are to be forwarded to different next hops.

Figure 8:
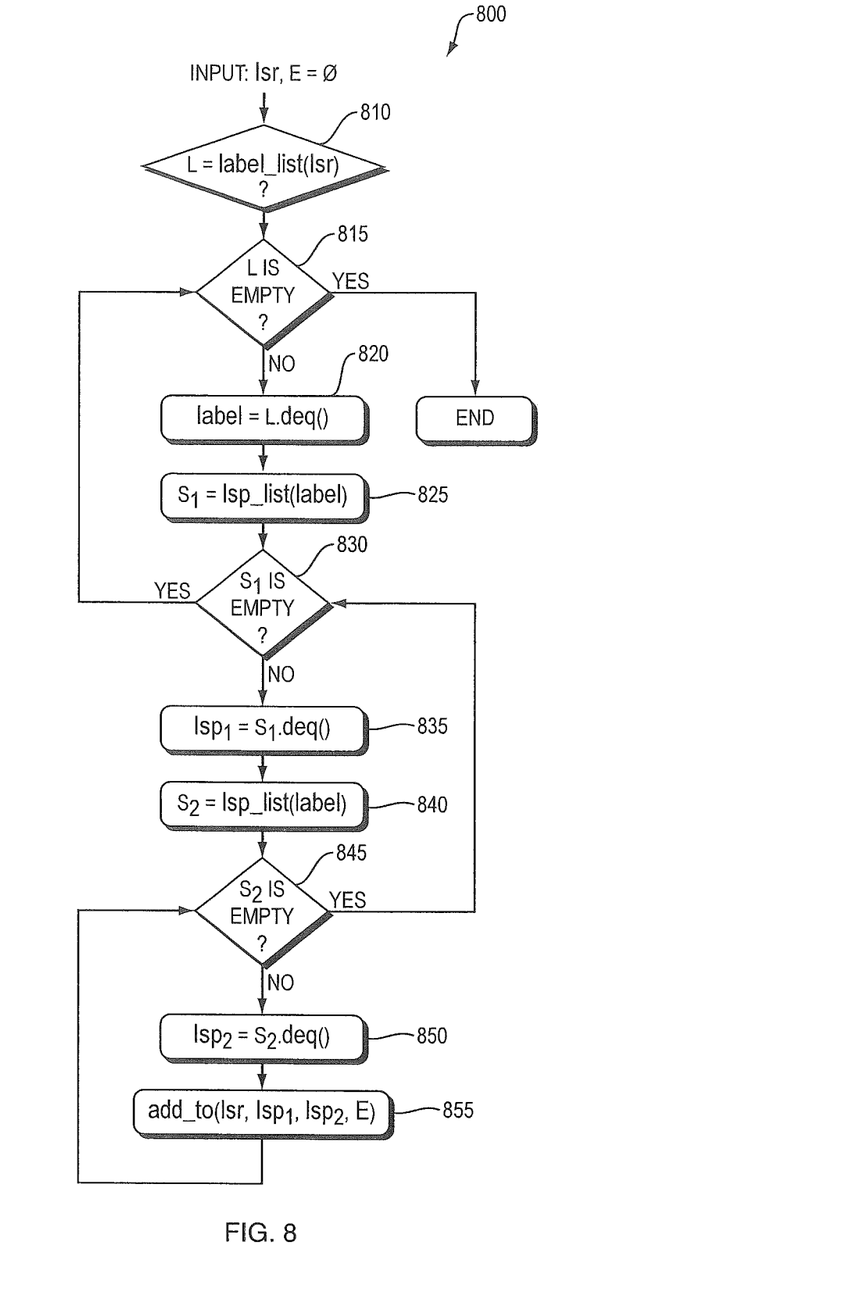
FIG. 8 is a flow diagram of a method for reducing LFIB space.
Figure 9:
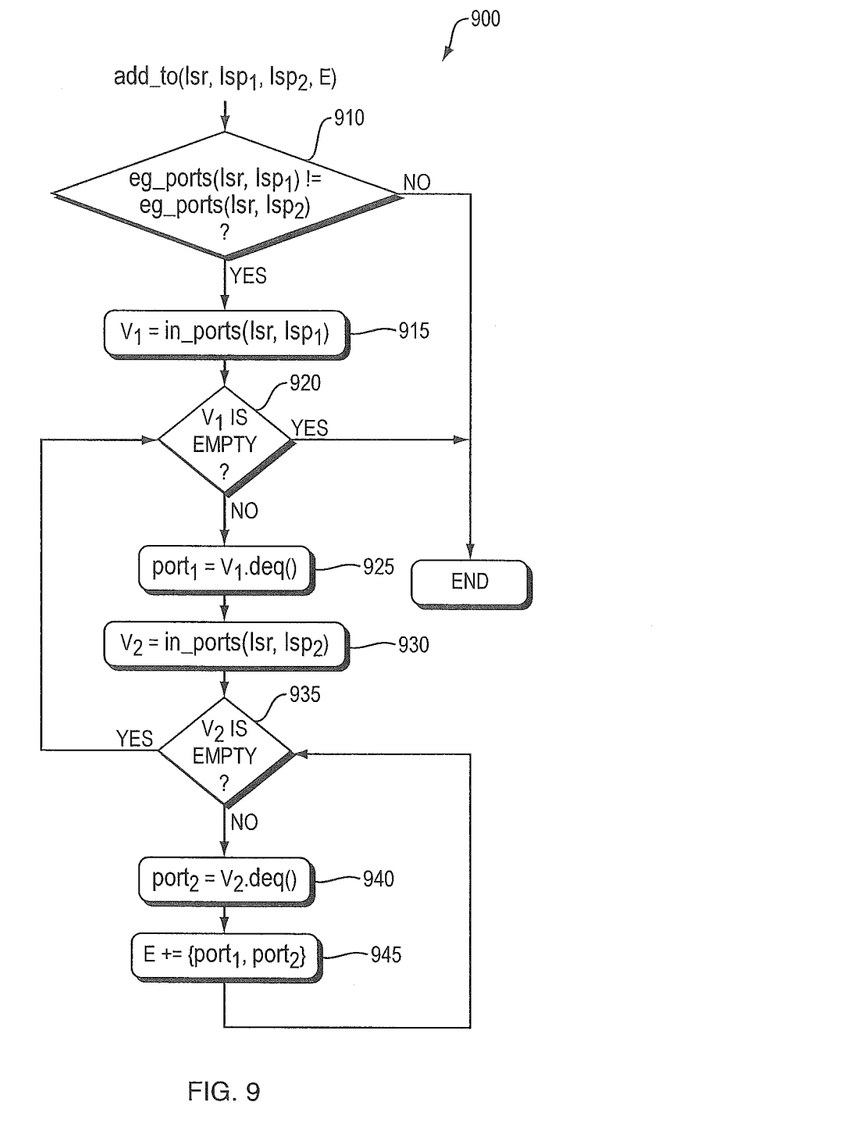
FIG. 9 is a flow diagram of a sub-process of FIG. 8.

A method of determining whether a VRF_id may be assigned to two or more ports of an LSR to conserve LFIB resources is illustrated in FIGS. 8-9. In particular, FIGS. 8-9 illustrate methods 800, 900 for determining whether conflicts exist between two or more ports, and constructing a conflict graph, similar to the conflict graph of FIG. 6, that identifies which ports may share a VRF_id.

In step 810, a set of all labels for LSPs traversing a particular LSR is defined. In step 815, it is determined whether the set is empty, and if not the process proceeds to step 820. In step 820, a first label is selected, and in step 825 a set S1 is defined by all LSPs assigned with the selected label. In step 830, it is determined whether this set of ports is empty, and if not, the process proceeds to step 835. If, however, the set of LSPs is empty, the process returns to step 815, where it is determined if any other labels remain in the set L and a new label is selected for analysis.

In step 835, a first LSP is selected from the set of ports. In step 840, a set S2 of all other LSPs assigned with the selected label (i.e., other than the first selected LSP) is defined. In step 845 it is determined whether this set is empty. For example, it may be determined that only the first selected LSP is assigned with the selected label, in which case the process returns to step 830. However, for example, it may be determined that at least one other LSP shares the selected label with the first selected LSP, in which case a second LSP is selected from the set S2 in step 850.

In step 855, an edge is added to the graph to represent a conflict between the first selected LSP and the second selected LSP, if such a conflict exists, as explained in detail with respect to FIG. 9. The process then returns to step 845, and additional LSPs from the set S2 are selected until no further potentially conflicting LSPs exist.

In step 910, it is determined whether the list of egress ports on the LSR traversed by the first selected LSP ($LSP_1$) matches the list of egress ports on the LSR traversed by the second selected LSP ($LSP_2$). If these egress ports match, the process 900 is ended. For example, if the egress ports on the LSR for $LSP_1$ and $LSP_2$ are the same, the next hop on the network will be the same for $LSP_1$ and $LSP_2$, and therefore there is no conflict in assigning the same VRF_id to both paths. However, if there is no match, the process continues to step 915.

In step 915, a set of all ingress ports on the LSR traversed by $LSP_1$ is defined by V1. If V1 is determined to be empty in step 920, the process ends. If not, however, a first ingress port is selected at step 925 and a vertex is created for that port. In step 930, a set of all ingress ports traversed by $LSP_2$ is defined by V2. If it is determined that at least one port exists in set V2, a second port is selected in step 940 and a vertex is created for that port. In step 945, an edge is created on the graph between the first selected ingress port vertex and the second selected ingress port vertex. For example, the edge indicates that the first selected port and the second selected port cannot share a VRF_id, because each of the first and second selected ports may receive packets from commonly labeled $LSP_1$ and $LSP_2$, but must be forwarded to different next hops. Accordingly, assigning the same VRF_id to both ports would result in packets from $LSP_1$ and $LSP_2$ being incorrectly forwarded to the same next hop. This process of selecting ingress ports of $LSP_1$ and $LSP_2$ and establishing edges on the graph is repeated until no further ports remain in the sets V1 and V2.

Figure 10:
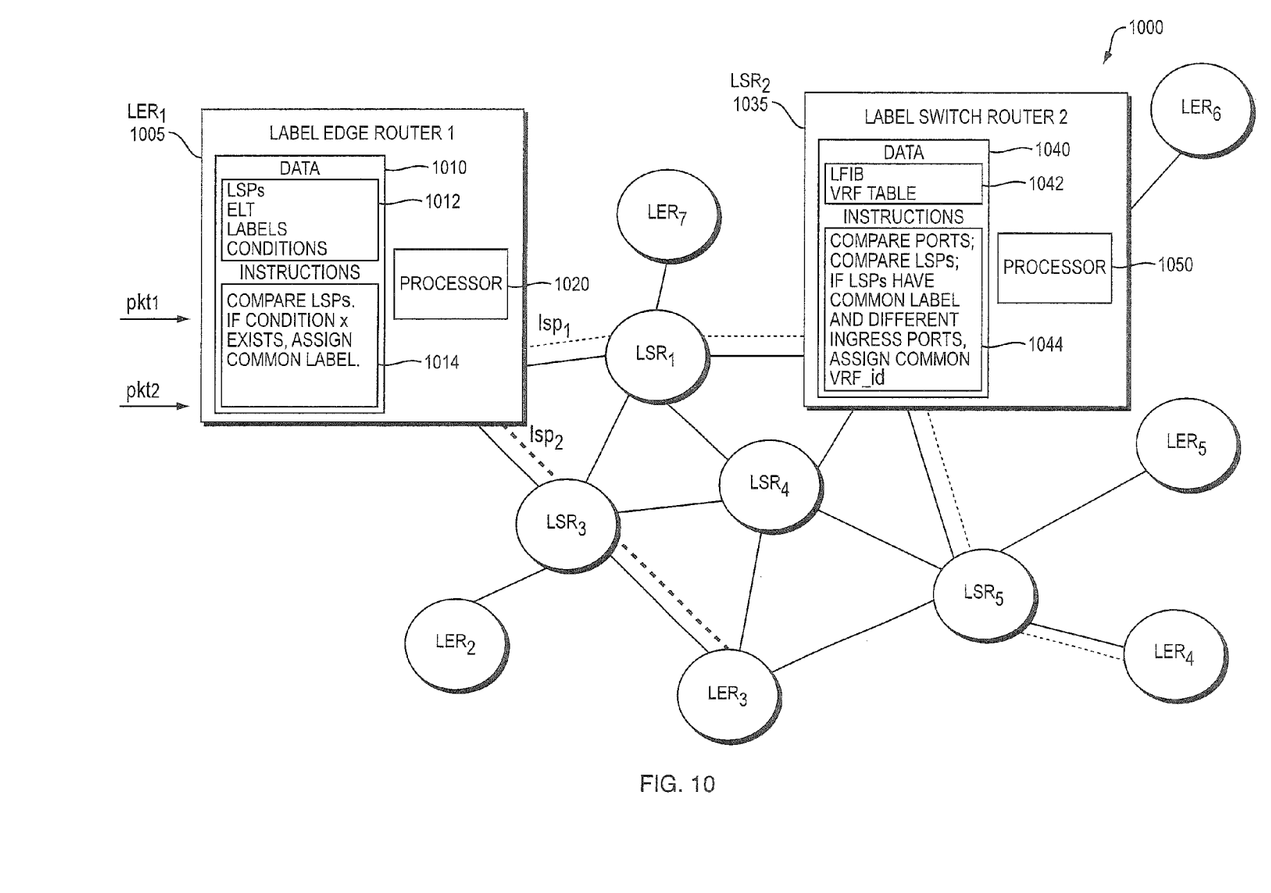
FIG. 10 is a system diagram according to an aspect of the invention.

The above-described methods for reducing label space may be executed by one or more processors in or connected to the LERs and LSRs in an MPLS network. For example, FIG. 10 illustrates a system 1000 comprising a number of LERs and LSRs, including $LER_1$ 1005 and $LSR_2$ 1035, in an MPLS network. As shown, $LER_1$ 1005 includes a storage medium 1010, which further includes data 1012 and instructions 1014 for reducing consumption of label space (e.g., according to the steps of methods 500 and 700). The $LER_1$ 1005 also includes a processor 1020 for reading and executing the data 1012 and instructions 1014 from the storage medium 1010. Similarly, $LSR_2$ 1035 includes a storage medium 1040 storing data 1042 and instructions 1044 for reducing space on the LSR2 1035 by reducing a number of VRF_ids assigned (e.g., according to the steps of the methods 800 and 900). $LSR_2$ 1035 further includes a processor 1050 for reading and executing the data 1042 and instructions 1044 from the storage medium 1040.

The storage media 1010, 1040 may be memory built into the $LER_1$ and $LSR_2$ routers 1005, 1035, such as random access memory (RAM) or read only memory (ROM) units. Alternatively or additionally, storage media 1010, 1040 may include removable storage devices connected to the $LER_1$ 1005 and $LSR_2$ 1035, such as readable disks, external hard drives, or universal serial bus drives. According to one aspect, a single storage media may be accessed by a plurality of LERs or LSRs. Alternatively, a software module may be separately stored and executed on a piece of hardware including its own processor connected to each router or to more than one router.

The above described methods for reducing label space in an MPLS network are beneficial in they increase storage and processing capabilities of routers. In turn, network performance may be improved (e.g., networks may be capable of handling increased transmissions and overall transmission time may be reduced), and network size may be increased without sacrificing quality of service. Additionally, the cost of implementing networks may be reduced because the resources will be used most efficiently.

Although the present invention has been described with reference to particular embodiments, it should be understood that these examples are merely illustrative of the principles and applications of the present invention. For example, the present invention may be used to efficiently implement rules generated according to any of a number of routing protocols, such as BGP, ISIS, OSPF, network manager, etc.

Moreover, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments and that other arrangements may be devised without departing from the spirit and scope of the present invention as defined by the appended claims.

The invention claimed is:

1. A router residing in a network, comprising:
a plurality of ingress ports;
a plurality of egress port;
a processor programmed to:
compare a plurality of label switch paths on the network,
determine whether a conflict exists between at least two label switch paths of the plurality of label switch paths based on the ingress ports and egress ports utilized by the label switch paths, wherein a conflict exists between two label switch paths if they share a common label, traverse a common router, and have different next hops, and
determine respective selected identifiers to be assigned to each of the at least two label switch paths, the selected identifiers being unique to each label switch path if a conflict exists and shared by the label switch paths if no conflict exists; and
a storage medium operatively coupled to the processor for storing the selected identifiers related to the label switch paths.

2. The router of claim 1, wherein a conflict further exists between two label switch paths if they utilize the same ingress port on the router and different egress ports on the router.

3. The router of claim 1, wherein the router is a label edge router in a multiple protocol label switching network.

4. The router of claim 3, wherein the storage medium includes an encapsulation label table.

5. The router of claim 1, wherein the processor is further programmed to determine whether a conflict exists by constructing a conflict graph illustrating a relationship between the at least two label switch paths in the plurality of label switch paths.

6. The router of claim 1, wherein the processor is further programmed to:
compare any label switch paths assigned with a common label;
identify the ingress ports and the egress ports on a router utilized by the commonly labeled paths;
assign a common virtual routing and forwarding identifier to the ingress ports utilized by the label switch paths, unless a predetermined condition is satisfied.

7. The router of claim 6, wherein the predetermined condition is satisfied if two or more commonly labeled paths utilize a common ingress port on the router, and different egress ports on the router.

8. The router of claim 7, wherein the assigned virtual routing and forwarding identifier in a label forwarding information base in the storage medium.

9. A router residing in a network, comprising:
a plurality of ingress ports;
a plurality of egress ports;
a processor programmed to:
compare a plurality of label switch paths on the network,
determine which ones of the plurality of label switch paths may be assigned the same label,
assigning one label to two or more label switch paths if the two or more label switch paths do not traverse a common router,
assigning one label to two or more label switch paths if the two or more label switch paths traverse a common router through different ingress ports of the common router, and
assigning one label to two or more label switch paths if the two or more label switch paths traverse a common router and are forwarded to the same next hop; and
a storage medium operatively coupled to the processor for storing the assigned labels in an encapsulation label table on a label edge router.

10. The router of claim 9, wherein the processor is further programmed to determine which ones of the plurality of label switch paths may be assigned the same label by constructing a conflict graph illustrating a relationship between at least two label switch paths in the plurality of label switch paths.

11. The router of claim 9, wherein the processor is further programmed to:
compare any label switch paths assigned with a common label;
identify the ingress ports and the egress ports on a router utilized by the commonly labeled paths;
assign a common virtual routing and forwarding identifier to the ingress ports utilized by the label switch paths, unless a predetermined condition is satisfied.

12. The router of claim 11, wherein the predetermined condition is satisfied if two or more commonly labeled paths utilize a common ingress port on the router, and different egress ports on the router.

13. The router of claim 12, wherein the assigned virtual routing and forwarding identifier in a label forwarding information base in the storage medium.

14. A method comprising:
comparing, by one or more processors, a plurality of label switch paths on the network;
determining, by the one or more processors, whether a conflict exists between at least two label switch paths of the plurality of label switch paths based on the ingress ports and egress ports utilized by the label switch paths, wherein a conflict exists between two label switch paths if they traverse a common router, share a common label, and have different next hops;
determining, by the one or more processors, respective selected identifiers to be assigned to each of the at least two label switch paths, the selected identifiers being unique to each label switch path if a conflict exists and shared by the label switch paths if no conflict; and
storing, by the one or more processors, the selected identifiers on a router in a network.

15. The method of claim 14, wherein the router is a label edge router and the network is a multiple protocol label switching network.

16. The method of claim 14, wherein the selected identifiers are stored in an encapsulation label table.

17. The method of claim 14, wherein determining whether a conflict exists includes constructing a conflict graph illustrating a relationship between the at least two label switch paths in the plurality of label switch paths.

18. The method of claim 14, further comprising:
comparing, by the one or more processors, any label switch paths assigned with a common label;
identifying, by the one or more processors, the ingress ports and the egress ports on a router utilized by the commonly labeled paths;
assigning, by the one or more processors, a common virtual routing and forwarding identifier to the ingress ports utilized by the label switch paths, unless a predetermined condition is satisfied.

19. The method of claim 18, wherein the predetermined condition is satisfied if two or more commonly labeled paths utilize a common ingress port on the router, and different egress ports on the router.

20. The method of claim 19, further comprising storing, by the one or more processors, the assigned virtual routing and forwarding identifier in a label forwarding information base.

* * * * *